(12) United States Patent
Funge et al.

(10) Patent No.: US 9,510,043 B2
(45) Date of Patent: *Nov. 29, 2016

(54) PRE-BUFFERING AUDIO STREAMS

(71) Applicant: NETFLIX, INC., Los Gatos, CA (US)

(72) Inventors: John Funge, Sunnyvale, CA (US); Greg Peters, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,527

(22) Filed: Apr. 27, 2015

(65) Prior Publication Data

US 2015/0245093 A1     Aug. 27, 2015

Related U.S. Application Data

(63) Continuation of application No. 12/964,728, filed on Dec. 9, 2010, now Pat. No. 9,021,537.

(51) Int. Cl.
| | | |
|---|---|---|
| *H04N 7/173* | (2011.01) | |
| *H04N 21/44* | (2011.01) | |
| *H04N 21/43* | (2011.01) | |
| *H04N 21/439* | (2011.01) | |
| *H04L 29/06* | (2006.01) | |
| *H04N 21/231* | (2011.01) | |
| *H04N 21/234* | (2011.01) | |
| *H04N 21/239* | (2011.01) | |
| *H04N 21/647* | (2011.01) | |

(52) U.S. Cl.
CPC .... *H04N 21/44004* (2013.01); *H04L 65/4084* (2013.01); *H04N 21/231* (2013.01); *H04N 21/2393* (2013.01); *H04N 21/23406* (2013.01); *H04N 21/4307* (2013.01); *H04N 21/4392* (2013.01); *H04N 21/647* (2013.01)

(58) Field of Classification Search
None
See application file for complete search history.

(56) References Cited

U.S. PATENT DOCUMENTS

| | | | | | |
|---|---|---|---|---|---|
| 5,586,264 | A | * | 12/1996 | Belknap | G06F 3/0601 707/E17.028 |
| 5,754,938 | A | * | 5/1998 | Herz | G06Q 20/383 348/E7.056 |
| 6,128,712 | A | * | 10/2000 | Hunt | G11B 27/105 348/E7.061 |
| 6,519,011 | B1 | * | 2/2003 | Shendar | H04N 5/4401 348/731 |
| 7,430,222 | B2 | * | 9/2008 | Green | H04L 29/06027 348/E5.002 |
| 7,474,359 | B2 | * | 1/2009 | Sullivan | H04N 5/4401 348/14.12 |
| 7,530,090 | B2 | * | 5/2009 | Korst | H04N 7/17327 725/100 |
| 7,996,872 | B2 | * | 8/2011 | Levy | H04N 21/23431 348/553 |
| 8,577,993 | B2 | * | 11/2013 | Gao | H04L 67/2842 709/217 |

(Continued)

OTHER PUBLICATIONS

European Search Report dated Dec. 11, 2015, in Application No. 11 84 7680.

*Primary Examiner* — Fernando Alcon
(74) *Attorney, Agent, or Firm* — Artegis Law Group, LLP (57) ABSTRACT

One embodiment of the present invention sets forth a technique for identifying and pre-buffering audio/video stream pairs. The method includes the steps of predictively identifying for pre-buffering at least one audio/video stream pair that may be selected for playback by a user subsequent to a currently playing audio/video stream pair, computing a first rate for pre-buffering an audio portion of the at least one audio/video stream pair and a second rate for pre-buffering a video portion of the at least one audio/video stream pair, downloading the audio portion at the first rate and downloading the video portion at the second rate, and storing the downloaded audio portion and the downloaded video portion in a content buffer.

20 Claims, 6 Drawing Sheets

(56) References Cited

U.S. PATENT DOCUMENTS

| | | | |
|---|---|---|---|
| 2002/0089587 A1* | 7/2002 | White | G11B 27/034 348/105 |
| 2002/0143973 A1 | 10/2002 | Price | |
| 2002/0188956 A1* | 12/2002 | Ficco | H04N 5/4401 725/110 |
| 2003/0172134 A1* | 9/2003 | Zervas | G06F 17/30902 709/219 |
| 2004/0001500 A1* | 1/2004 | Castillo | H04N 5/50 370/437 |
| 2004/0111741 A1* | 6/2004 | DePietro | H04N 5/50 725/34 |
| 2004/0128694 A1* | 7/2004 | Bantz | H04N 5/4401 725/95 |
| 2004/0181813 A1* | 9/2004 | Ota | H04N 5/4401 725/131 |
| 2005/0138658 A1* | 6/2005 | Bryan | H04H 60/27 725/46 |
| 2005/0149975 A1* | 7/2005 | Jutzi | H04L 29/06027 725/95 |
| 2005/0216948 A1* | 9/2005 | MacInnis | H04N 21/23406 725/117 |
| 2006/0037037 A1* | 2/2006 | Miranz | H04N 7/17318 725/2 |
| 2006/0075428 A1* | 4/2006 | Farmer | H04N 5/4401 725/38 |
| 2006/0085828 A1* | 4/2006 | Dureau | H04N 5/4401 725/100 |
| 2007/0067821 A1* | 3/2007 | Fang | H04K 1/00 726/1 |
| 2007/0102764 A1* | 5/2007 | Ando | G11B 20/00086 257/355 |
| 2007/0204320 A1* | 8/2007 | Wu | H04N 5/4401 725/135 |
| 2007/0234395 A1* | 10/2007 | Dureau | H04N 5/4401 725/135 |
| 2007/0263066 A1* | 11/2007 | Henning | H04N 5/4401 348/14.01 |
| 2007/0287451 A1* | 12/2007 | Seo | H04H 20/26 455/434 |
| 2007/0288965 A1* | 12/2007 | Murakami | H04N 5/4543 725/46 |
| 2008/0056145 A1 | 3/2008 | Woodworth | |
| 2008/0163303 A1* | 7/2008 | Chou | H04N 7/163 725/46 |
| 2008/0244665 A1* | 10/2008 | Bowen | H04N 7/163 725/83 |
| 2009/0190582 A1 | 7/2009 | Nambiath et al. | |
| 2010/0050211 A1* | 2/2010 | Seldin | H04N 5/44543 725/46 |
| 2010/0111059 A1* | 5/2010 | Bappu | H04N 7/17318 370/338 |
| 2010/0146569 A1* | 6/2010 | Janardhan | H04N 7/17318 725/98 |
| 2011/0214148 A1* | 9/2011 | Gossweiler, III | H04N 21/235 725/46 |
| 2012/0131627 A1* | 5/2012 | Chittella | H04N 21/2381 725/109 |
| 2012/0222065 A1* | 8/2012 | Prins | H04N 21/432 725/32 |
| 2013/0042288 A1* | 2/2013 | Fondberg | H04N 21/23106 725/109 |
| 2013/0191511 A1* | 7/2013 | Liu | H04L 67/2847 709/219 |
| 2014/0149532 A1* | 5/2014 | Kim | H04L 67/2852 709/213 |
| 2014/0201802 A1* | 7/2014 | Boss | H04N 21/4263 725/134 |
| 2014/0259067 A1* | 9/2014 | Yao | H04N 21/482 725/39 |

* cited by examiner

PRE-BUFFERING AUDIO STREAMS

CROSS-REFERENCE TO RELATED APPLICATIONS

This application is a continuation of the co-pending U.S. patent application titled, "PRE-BUFFERING AUDIO STREAMS," filed on Dec. 9, 2010 and having Ser. No. 12/964,728. The subject matter of this related application is hereby incorporated herein by reference.

BACKGROUND OF THE INVENTION

Field of the Invention

Embodiments of the present invention relate generally to digital media and, more specifically, to pre-buffering audio streams.

Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof.

The content player is configured to download and play a digital content file, in response to a user request selecting the title for playback. The process of playing the digital content file includes decoding and rendering audio and video data into an audio signal and a video signal, which may drive a display system having a speaker subsystem and a video subsystem. Playback typically involves a technique known in the art as "streaming," whereby the content server sequentially transmits the digital content file to the content player, and the content player plays the digital content file while content data is received that comprises the digital content file.

In a typical streaming system, a certain amount of the audio and video data associated with the currently selected digital content file needs to be buffered before the digital content file can be played with an acceptable quality. In a scenario where a user rapidly switches between digital content files, the buffering requirements results in interrupted playback since the newly selected digital content first must be buffered.

As the foregoing illustrates, what is needed in the art is an approach for buffering digital content files that may be selected by the user for viewing next.

SUMMARY OF THE INVENTION

One embodiment of the present invention sets forth a computer-implemented method for identifying and pre-buffering audio/video stream pairs. The method includes the steps of predictively identifying for pre-buffering at least one audio/video stream pair that may be selected for playback by a user subsequent to a currently playing audio/video stream pair, computing a first rate for pre-buffering an audio portion of the at least one audio/video stream pair and a second rate for pre-buffering a video portion of the at least one audio/video stream pair, downloading the audio portion at the first rate and downloading the video portion at the second rate, and storing the downloaded audio portion and the downloaded video portion in a content buffer.

Advantageously, pre-buffering audio/video stream pairs having a high probability of being selected for viewing next allows for a seamless transition when a user selects one of the pre-buffered audio/video stream pairs for viewing. In addition, pre-buffering the audio portion of an audio/video stream pair at a higher rate than the video portion of the audio/video stream pair allows for playback to be started faster without compromising audio quality.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
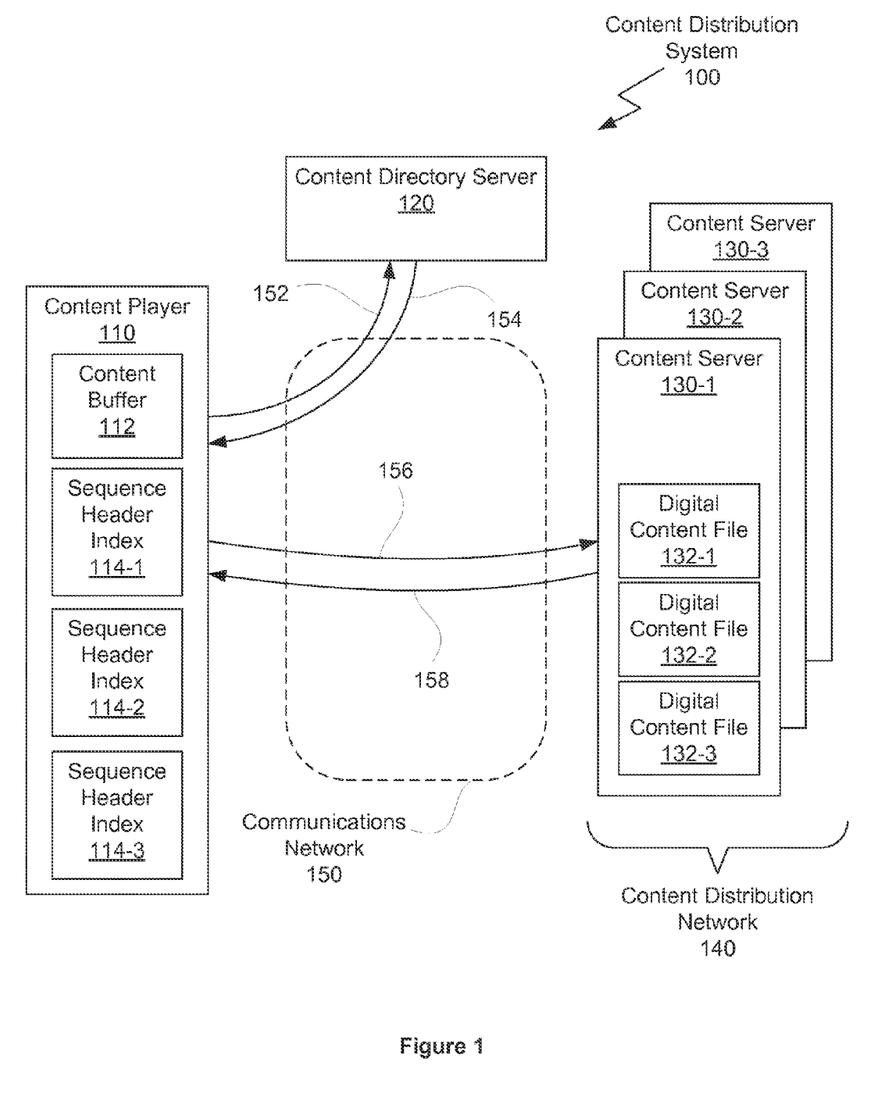
FIG. 1 illustrates a content distribution system configured to implement one or more aspects of the present invention.

FIG. 1 illustrates a content distribution system 100 configured to implement one or more aspects of the present invention. As shown, the content distribution system 100 includes, without limitation, a content player 110, one or more content servers 130, and a communications network 150. The content distribution system 100 may also include a content directory server 120. In one embodiment, the one or more content servers 130 comprise a content distribution network (CDN) 140.

The communications network 150 includes a plurality of network communications systems, such as routers and switches, configured to facilitate data communication between the content player 110 and the one or more content servers 130. Persons skilled in the art will recognize that many technically feasible techniques exist for building the communications network 150, including technologies practiced in deploying the well-known internet communications network.

The content directory server 120 comprises a computer system configured to receive a title lookup request 152 and generate file location data 154. The title lookup request 152 includes, without limitation, a name of a movie or song requested by a user. The content directory server 120 queries a database (not shown) that maps a video stream of a given title encoded at a particular playback bit rate to a digital content file 132, residing within an associated content server 130. The file location data 154 includes, without limitation, a reference to a content server 130 that is configured to provide the digital content file 132 to the content player 110.

The content server 130 is a computer system configured to serve download requests for digital content files 132 from the content player 110. The digital content files may reside on a mass storage system accessible to the computer system. The mass storage system may include, without limitation, direct attached storage, network attached file storage, or network attached block-level storage. The digital content files 132 may be formatted and stored on the mass storage system using any technically feasible technique. A data transfer protocol, such as the well-known hyper-text transfer protocol (HTTP), may be used to download digital content files 132 from the content server 130 to the content player 110.

Each title (a movie, song, or other form of digital media) is associated with one or more digital content files 132. Each digital content file 132 comprises, without limitation, a sequence header index 114, audio data and an encoded sequence. An encoded sequence comprises a complete version of the video data corresponding title encoded to a particular playback bit rate. For example, a given title may be associated with digital content file 132-1 and digital content file 132-2. Digital content file 132-1 may comprise sequence header index 114-1 and an encoded sequence encoded to an average playback bit rate of approximately 250 kilobits per second (Kbps). Digital content file 132-2 may comprise sequence header index 114-2 and an encoded sequence encoded to an average playback bit rate of approximately 1000 Kbps. The 1000 Kbps encoded sequence enables higher quality playback and is therefore more desirable for playback versus the 250 Kbps encoded sequence.

An encoded sequence within a digital content file 132 is organized as units of video data representing a fixed span of playback time. Overall playback time is organized into sequential time slots, each corresponding to one fixed span of playback time. For a given time slot, one unit of video data is represented within the digital content file 132 for the playback bit rate associated with the digital content file 132.

Persons skilled in the art will readily recognize that each encoded sequence, as defined above, comprises a digital content "stream." Furthermore, the process of downloading a particular encoded sequence from the content server 130 to the content player 110 comprises "streaming" the digital content to the content player 110 for playback at a particular playback bit rate.

The content player 110 may comprise a computer system, a set top box, a mobile device such as a mobile phone, or any other technically feasible computing platform that has network connectivity and is coupled to or includes a display device and speaker device for presenting video frames, and generating acoustic output, respectively.

Although, in the above description, the content distribution system 100 is shown with one content player 110 and one CDN 140, persons skilled in the art will recognize that the architecture of FIG. 1 contemplates only an exemplary embodiment of the invention. Other embodiments, may include any number of content players 110 and/or CDNs 140. Thus, FIG. 1 is in no way intended to limit the scope of the present invention in any way.

Figure 2:
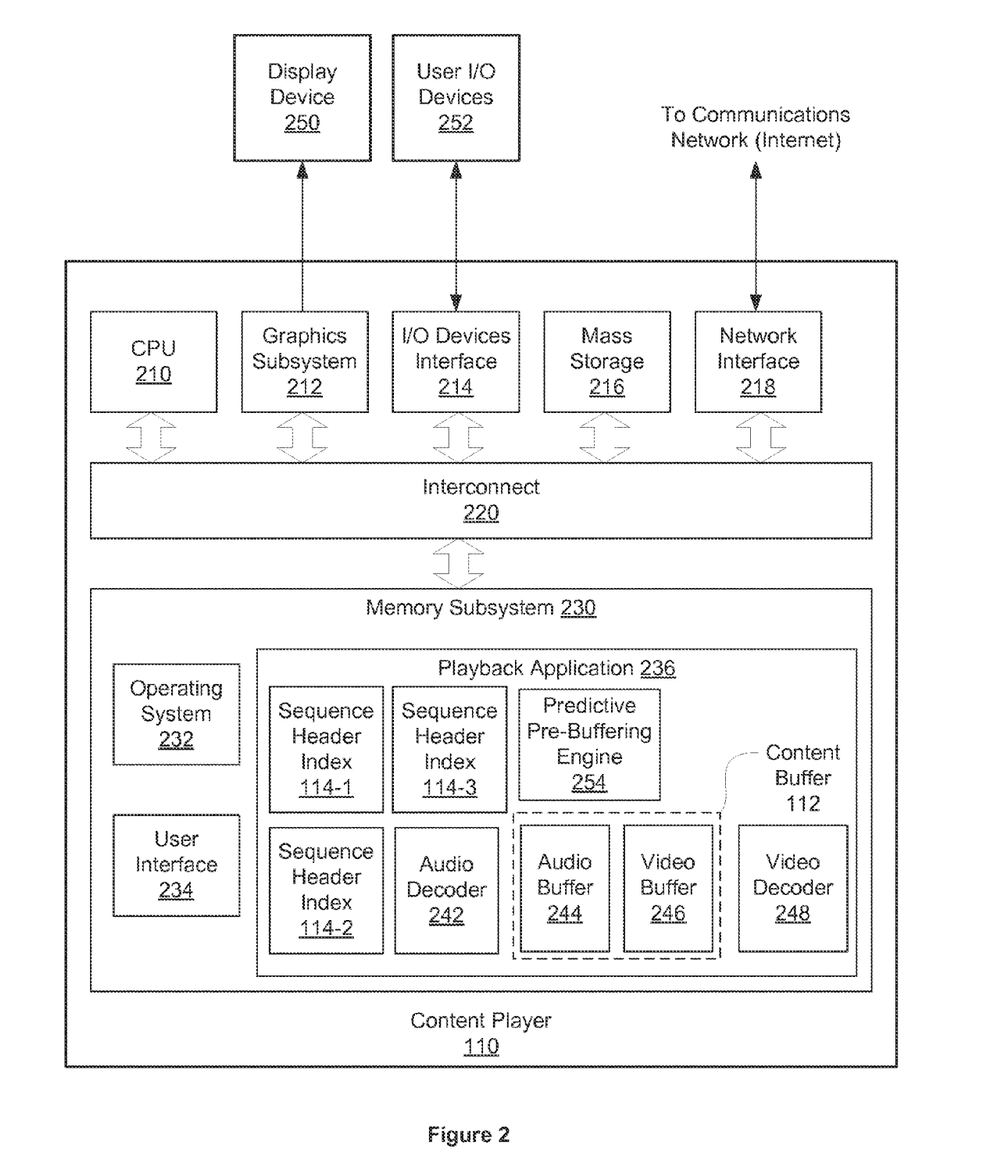
FIG. 2 is a more detailed view of the content player of FIG. 1, according to one embodiment of the invention.

FIG. 2 is a more detailed view of the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 220 is configured to facilitate transmission of data, such as programming instructions and application data, between the CPU 210, graphics subsystem 212, I/O devices interface 214, mass storage 216, network interface 218, and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 220. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 150. In one embodiment, the network interface 218 is configured to communicate using the well-known Ethernet standard. The network interface 218 is coupled to the CPU 210 via the interconnect 220.

The memory subsystem 230 includes programming instructions and data that comprise an operating system 232, user interface 234, and playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234 provides a specific structure, such as a window and object metaphor, for user interaction with content player 110. Persons skilled in the art will recognize the various operating systems and user interfaces that are well-known in the art and suitable for incorporation into the content player 110.

The playback application 236 is configured to retrieve a digital content file 132 from a content server 130 via the network interface 218 and play the digital content file 132 through the graphics subsystem 212. The graphics subsystem 212 is configured to transmit a rendered video signal to the display device 250. In normal operation, the playback application 236 receives a request from a user to play a specific title. The playback application 236 then locates the digital content files 132 associated with the requested title, where each digital content file 132 associated with the requested title includes an encoded sequence encoded to a different playback bit rate. In one embodiment, the playback application 236 locates the digital content files 132 by posting title lookup request 152 to the content directory server 120. The content directory server 120 replies to the title lookup request 152 with file location data 154 for each digital content file 132 associated with the requested title. Each file location data 154 includes a reference to the associated content server 130, in which the requested digital content file 132 resides. The title lookup request 152 may include the name of the requested title, or other identifying information with respect to the title. After the playback application 236 has located the digital content file 132 associated with the requested title, the playback application 236 downloads the sequence header index 114 associated with the digital content file 132 associated with the requested title from the content server 130. A sequence header index 114 associated with digital content file 132, described in greater detail in FIG. 4A, includes information related to the encoded sequence included in the digital content file 132.

In one embodiment, the playback application 236 begins downloading the digital content file 132 associated with the requested title. The requested digital content file 132 is downloaded into the content buffer 112, configured to serve as a first-in, first-out queue. In one embodiment, each unit of downloaded data comprises a unit of video data or a unit of audio data. As units of video data associated with the requested digital content file 132 are downloaded to the content player 110, the units of video data are pushed into the content buffer 112. Similarly, as units of audio data associated with the requested digital content file 132 are downloaded to the content player 110, the units of audio data are pushed into the content buffer 112. In one embodiment the units of video data are stored in video buffer 246 within the content buffer 112, and units of audio data are stored in audio buffer 224, also within the content buffer 112.

A video decoder 248 reads units of video data from the video buffer 246, and renders the units of video data into a sequence of video frames corresponding in duration to the fixed span of playback time. Reading a unit of video data from the video buffer 246 effectively de-queues the unit of video data from the video buffer 246 (and from the content buffer 112). The sequence of video frames is processed by graphics subsystem 212 and transmitted to the display device 250.

An audio decoder 242 reads units of audio data from the audio buffer 244, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates an acoustic output.

Figure 3:
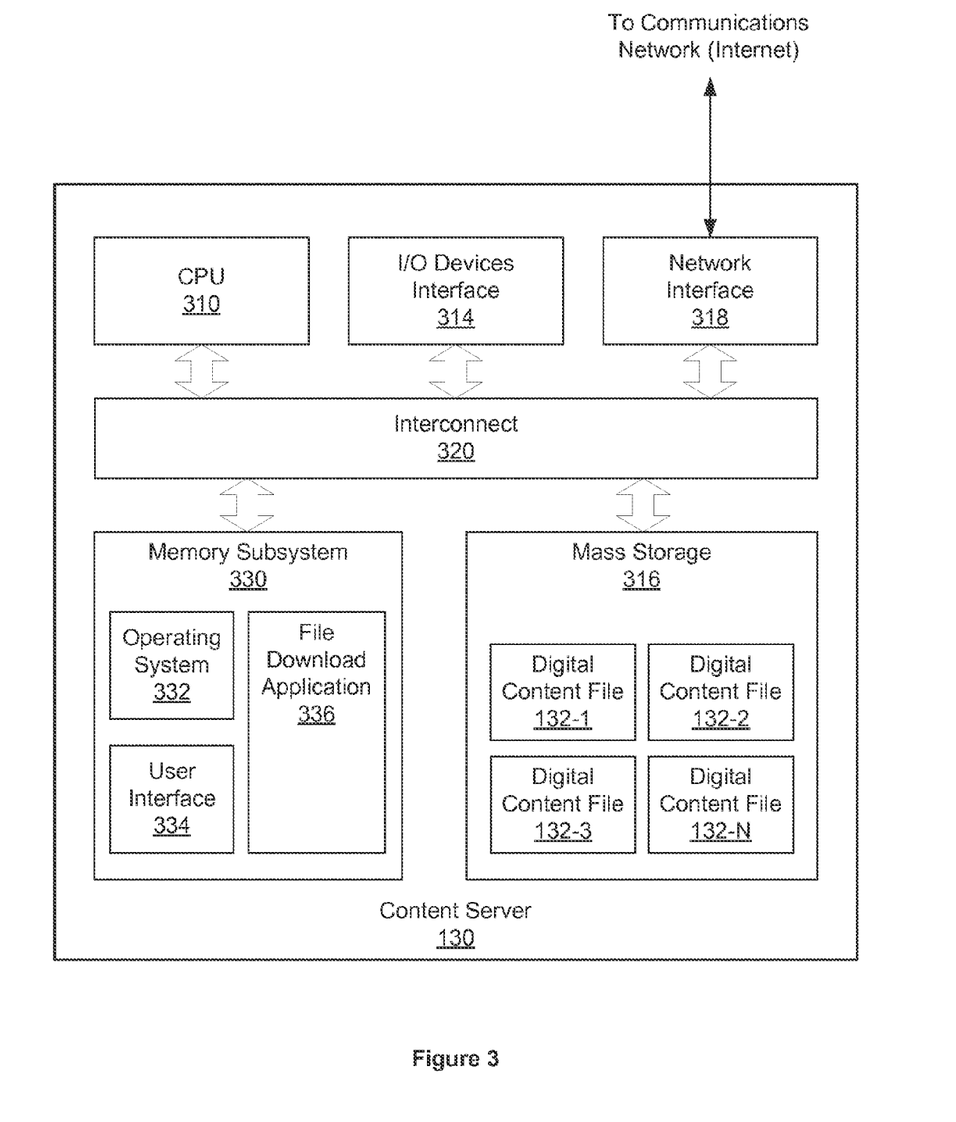
FIG. 3 is a more detailed view of the content server of FIG. 1, according to one embodiment of the invention.

FIG. 3 is a more detailed view of the content server 130 of FIG. 1, according to one embodiment of the invention. The content server 130 includes, without limitation, a central processing unit (CPU) 310, a network interface 318, an interconnect 320, a memory subsystem 330, and a mass storage unit 316. The content server 130 may also include an I/O devices interface 314.

The CPU 310 is configured to retrieve and execute programming instructions stored in the memory subsystem 330. Similarly, the CPU 310 is configured to store and retrieve application data residing in the memory subsystem 330. The interconnect 320 is configured to facilitate transmission of data, such as programming instructions and application data, between the CPU 310, I/O devices interface 314, mass storage unit 316, network interface 318, and memory subsystem 330.

The mass storage unit 316 stores digital content files 132-1 through 132-N. The digital content files 132 may be stored using any technically feasible file system on any technically feasible media. For example the mass storage unit 316 may comprise a redundant array of independent disks (RAID) system incorporating a conventional file system.

The memory subsystem 330 includes programming instructions and data that comprise an operating system 332, a user interface 334, and a file download application 336. The operating system 332 performs system management functions such as managing hardware devices including the network interface 318, mass storage unit 316, and I/O devices interface 314. The operating system 332 also provides process and memory management models for the user interface 334 and the file download application 336. The user interface 334 provides a specific structure, such as a window and an object metaphor or a command line interface, for user interaction with content server 130. A user may employ the user interface 334 to manage functions of the content server. In one embodiment, the user interface 334 presents a management web page for managing operation of the content server 130. Persons skilled in the art will recognize the various operating systems and user interfaces that are well-known in the art and suitable for incorporation into the content player 130.

The file download application 336 is configured to facilitate transfer of digital content files 132-1 to 132-N, to the content player 110, via a file download operation or set of operations. The downloaded digital content file 132 is transmitted through network interface 318 to the content player 110 via the communications network 150. In one embodiment, file contents of a digital content file 132 may be accessed in an arbitrary sequence (known in the art as "random access"). As previously described herein, each digital content file 132 includes a sequence header index 114 and an encoded sequence. An encoded sequence comprises a full version of a given movie or song encoded to a particular bit rate, and video data associated with the encoded sequence is divided into units of video data. Each unit of video data corresponds to a specific span of playback time and begins with a frame including a sequence header specifying the size and the resolution of the video data stored in the unit of video data.

Figure 4A:
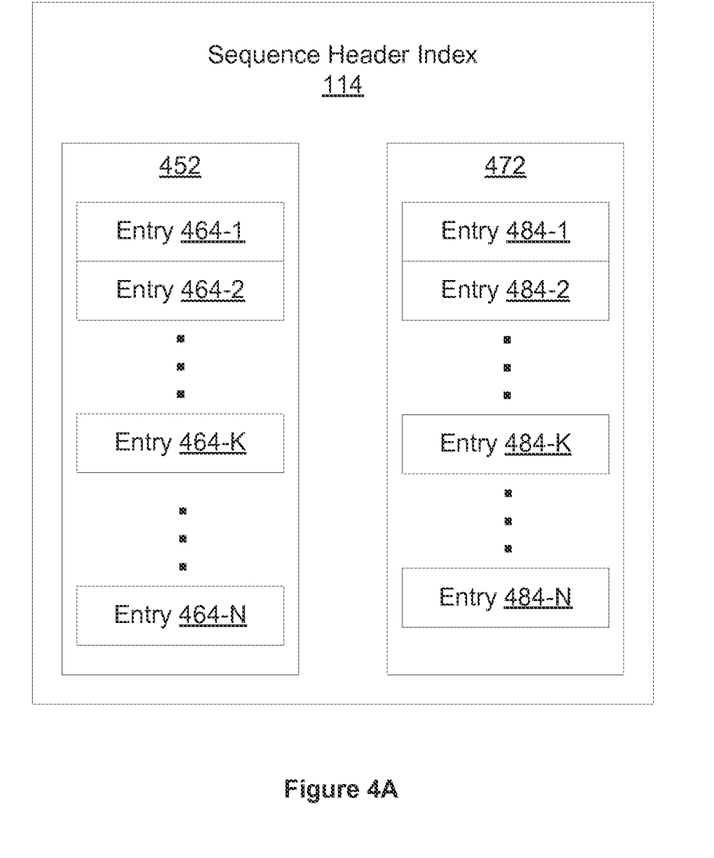
FIG. 4A is a more detailed view of the sequence header index of FIG. 1, according to one embodiment of the invention.

FIG. 4A is a more detailed view of the sequence header index 114 of FIG. 1, according one embodiment of the invention. The sequence header index 114 is a data structure that includes a video bit rate profile 452 and can be populated in any technically feasible fashion.

The sequence header index 114 included in the digital content file 132 specifies information related to the encoded sequence also included in the digital content file 132. The video bit rate profile 452 includes a corresponding set of entries 464 that specifies the locations and the timestamp offsets of the different sequence headers associated with the units of video data of the encoded sequence. Typically, the sequence headers in the encoded sequence are located at predictable timestamp offsets within the encoded sequence (e.g. every 3 seconds). A given entry 464 indicates a timestamp offset and the location of a specific sequence header included in a unit of video data of the encoded sequence associated with video bit rate profile 452. For example, entry 464-1 indicates the timestamp offset and the location of the sequence header associated with a first unit of video data of the encoded sequence. Entry 464-2 indicates the timestamp offset and the location of the sequence header associated with a second unit of video data of the same encoded sequence. Importantly, a total byte count characterizing how many bytes comprise a given encoded sequence from a current playback position, associated with entry 464-K, through completion of playback may be computed based on the timestamp offsets included in the set of entries 464.

The audio data associated with the enhanced sequence is also stored in the digital content file 132. In one embodiment, the audio data has a fixed bit rate encoding. In alternative embodiments a variable bit rate encoding technique is applied to audio data, and an audio bit rate profile 472 is included in the sequence header index 114. The audio bit rate profile 472 includes entries 484 configured to store a timestamp offset and a sequence header location for each respective unit of audio data at a respective time of playback.

Figure 4B:
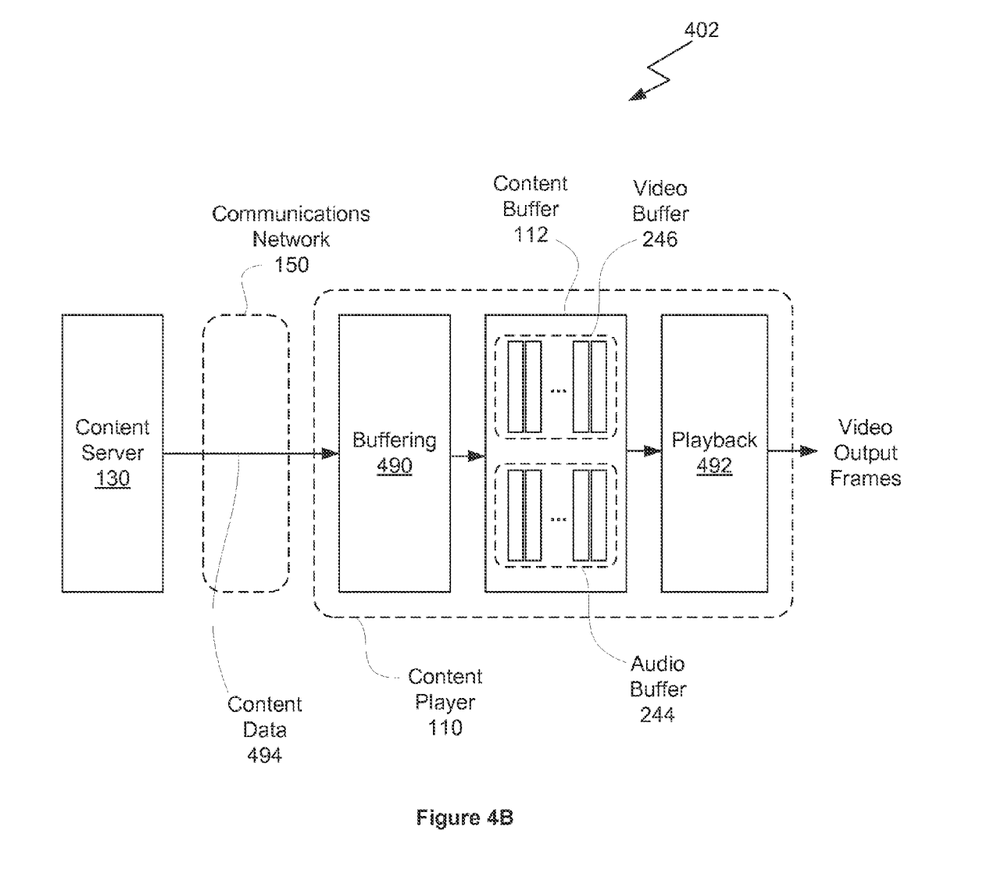
FIG. 4B illustrates data flow for buffering and playback of digital content associated with a digital content file, according to one embodiment of the invention.

FIG. 4B illustrates a data flow for buffering and playback of digital content 494 associated with a digital content file 132, according to one embodiment of the invention. The content server 130 of FIG. 1 provides content data 494, comprising units of audio data and units of video data, of the digital content file 132 to a buffering process 490. The buffering process 490 may be implemented as a thread executing within the content player 110. The buffering process 490 is configured to download the content data 494 and write the content data 494 to the content buffer 112. The buffering process 490 writes units of audio data to the audio buffer 244 within the content buffer 112, and units of video data to the video buffer 246, also within the content buffer 112. In one embodiment the content buffer 112 is structured as a first-in first-out (FIFO) queue. A playback process 492, also executing within the content player 110, de-queues units of audio data and units of video data from the content buffer 112 for playback. In order to maintain uninterrupted playback of content data 494, the content buffer 112 should always have at least one unit of audio data and one unit of video data available when the playback process 492 needs to perform a read on the content buffer 112.

During the playback of a digital content file 132 (referred to herein as "the currently playing digital content file 132") associated with a particular title, the predictive pre-buffering engine 254 identifies one or more other digital content files 132 associated with different titles that may be selected for viewing next and, thus, should be pre-buffered. In operation, the predictive pre-buffering engine 254 first determines a subset of digital content files 132 that may be selected for viewing next. In one embodiment, the subset of digital content files 132 may be determined based on the close proximity, in a user-interface, of different identifiers associated with the digital content files 132 included in the subset of digital content files 132 and the currently playing digital content file 132.

Once the subset of digital content files 132 that may be selected for viewing next is determined, the predictive pre-buffering engine 254 computes, an ordering of the subset of digital content files 132 is computed to indicate which digital content file 132 is most likely to be played next. In one embodiment, the ordering can be used to determine the amount to pre-buffer of each digital content file 132. The allocation could be arbitrary, such as allocate 50% to the most likely, 25% to the second and third. In an alternative embodiment, a numerical measure that induces an ordering is computed for the subset of digital content files. The numerical measure is then used to determine the amount to pre-buffer. For example, digital content file A is given a numerical measure of x and digital content file B is given a measure of y. The amount to pre-buffer can then be allocated proportionally, such as 2x can be allocated to digital content file A and the remainder to digital content file B.

In one embodiment, for each digital content file 132 in the subset of digital content files 132, a probability indicating the likelihood of the digital content file 132 being selected for viewing next is computed. In one embodiment, the probability (P) of a digital content file 132 (file i) being selected for viewing next can be computed as follows:

calculate P ("file i"|"various information").

The "various information" may include information such as the "currently playing digital content file 132," "the digital content files 132 that would be selected as the result of various UI actions" (for example, which digital content file 132 would start playing if a user pressed up/down/left/right on their controller), "titles that the user previously watched", "ratings from titles the user previously watched", "what UI actions other users performed in similar situations", "history of UI actions from the current and previous sessions." These examples of "various information" are not meant to be limiting in any way and those skilled in the art would recognize that any other relevant information can be used when computing the probability of a digital content file 132 being selected for viewing next.

There are many techniques know to those skilled in the art for computing the above probability based on the supplied information. In one embodiment, the predictive pre-buffering engine 254 includes one or more machine learning techniques, including for example, decision trees, hidden Markov models, Bayesian learning techniques, and other alternatives. Several machine learning techniques are known in the arts of artificial intelligence and machine learning. Among the many alternatives include techniques related to evolution strategies, genetic algorithms, genetic programming, multidimensional clustering, neural networks, and weighted majority techniques. In addition, the predictive pre-buffering engine 254 may compute a weighted average of a set of relatively simpler elements, updated in real time during actual user interaction using an exponential gradient technique, or some other machine learning technique.

Below an exemplary computation of a probability is illustrated. The example is provided for pedagogical purposes only and is not intended to be limiting in any way. In particular, Naïve Bayes is the method described, but some more sophisticated technique would almost always be used in practice. To simplify even further, it is assumed that a digital content file is currently being played and that the user may employ a channel surfing metaphor to either move up to select a new digital content file, or down to select a new digital content file. Some indication of which digital content file the user views next as they move up or down is also provided.

Based on these assumptions, the following probabilities are computed:

P("file above selected"|"various information")

P("file below selected"|"various information").

To simplify further, the information that the computation is conditioned on includes:

Is the title associated with the file above more popular or the title associated with the file below more popular?

For the current user, does the title associated with the file above have a higher predicted rating from a recommendation engine or does the title associated with the file below have a higher predicted rating from some recommendation engine.

To compute the probabilities, the following is determined:

P(above |"most popular","highest rated"),versus

P(below |"most popular","highest rated"),where the possible values for "most popular" and "highest rated" are "above" or "below".

Suppose that from previous historical records for the information that the probabilities are conditioned on, the following table can be constructed.

TABLE 1

| file selected? | most popular | highest rated |
|---|---|---|
| above | above | below |
| above | above | above |
| below | below | above |
| above | below | above |
| below | above | below |
| above | below | below |
| above | above | above |

From the Bayes rule then, it can be determined that:

$P(\text{above }|\text{"most popular","highest rated"})=kP(\text{"most popular","highest rated"}|\text{above})P(\text{above})$, where $k$ is some constant that is factored out, as shown below.

Applying the assumption of conditional independence, the following can be determined:

$P(\text{above }|\text{"most popular","highest rated"})=kP(\text{"most popular"}|\text{above})P(\text{"highest rated"}|\text{above})P(\text{above})$.

Based on Table 1, P(above |"most popular", "highest rated")=k 2/5*2/5*5/7=k 4/35 and P(below |"most popular", "highest rated")=k 1/14.

Since k 4/35>k 1/14, it can be concluded given this data that the user is more likely to select the digital content file from above. Furthermore, the probabilities can be calculated to be: P(above |"most popular", "highest rated")=56/91 and P(below |"most popular", "highest rated")=35/91. These probabilities can potentially be used to allocate memory to pre-buffering the digital content files 132 in proportion to the estimated probability with which those files will be selected.

Again, the example above is illustrated purely to show how a probability for a particular digital content file 132 can be computed. Persons skilled in the art will recognize that any other mathematical approach as well as other types of data can be used to compute the probability.

Based on the probabilities computed for the digital content files 132 in the subset of digital content files 132, the predictive pre-buffering engine 254 selects one or more digital content files 132 from the subset of digital content files 132 that should be pre-buffered. For each of the one or more digital content files 132 that should be pre-buffered, the predictive pre-buffering engine 254 determines a rate for pre-buffering the units of video data associated with the digital content file 132 and a rate for pre-buffering the units of audio data associated with the digital content file 132.

For a particular digital content file 132 selected for pre-buffering, the rates of pre-buffering the units of audio and video data are determined based on two factors. First, because audio data is typically much smaller than video data, the audio data is pre-buffered at a higher rate than the video data. Pre-buffing audio data at a higher rate than video data allows for a quick start to playing the digital content file 132 if the digital content file 132 is selected for playback without compromising audio delivery quality. Second, the rates of pre-buffering the units of audio and video data are proportional to the probability that the digital content file 132 will be selected for viewing next. If the probability is high, then the rates of pre-buffering the units of audio and video data are higher than the rates of pre-buffering units of audio and video data associated with a different digital content file 132 with a lower probability.

In one embodiment, if there are five digital content files 132 that are to be pre-buffered, the playback application 236 may download five seconds of audio data from the beginning of each of the five digital content files 132. In contrast, the playback application 236 may download only one second of video data from the beginning of each of the five digital content files 132, only two seconds of video data from the beginnings of two of the five digital content files 132 or no video data at all.

Figure 5:
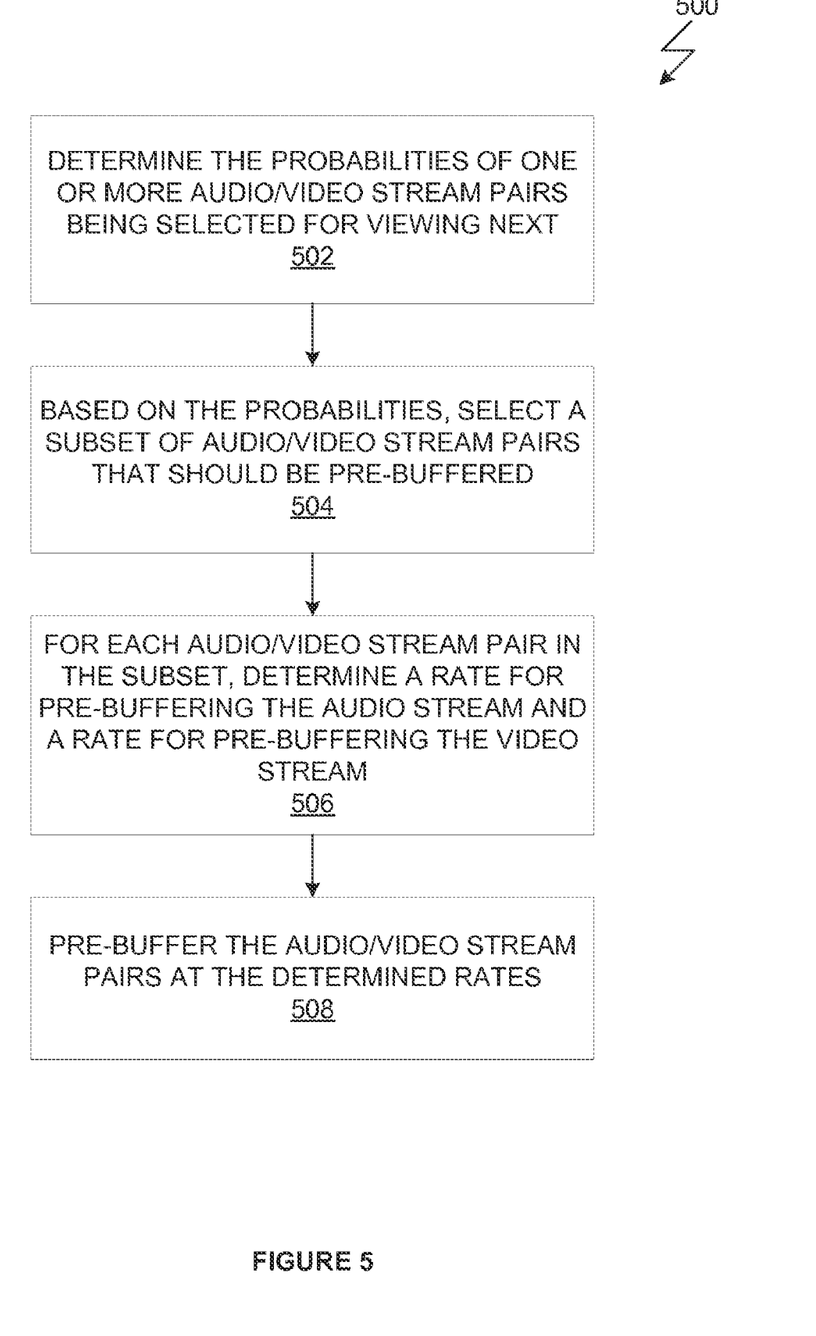
FIG. 5 is a flow diagram of method steps for identifying and pre-buffering audio/video stream pairs that may be selected for viewing next, according to one embodiment of the invention.

FIG. 5 is a flow diagram of method steps for identifying and pre-buffering audio/video stream pairs that may be selected for viewing next, according to one embodiment of the invention. Although the method steps are described in conjunction with the systems of FIGS. 1, 2, and 3, persons skilled in the art will understand that any system configured to perform the method steps, in any order, is within the scope of the inventions.

At step 502, the predictive pre-buffering engine 254 computes the probability of each of a set of audio/video stream pairs being selected for viewing next. The set of audio/video stream pairs are determined based on the currently playing audio/video stream pair. Each probability is computed based on various information, as described above.

At step 504, the predictive pre-buffering engine 254 selects, based on the respective probabilities, a subset of the audio/video stream pairs that should be pre-buffered. At step 506, the predictive pre-buffering engine 254 computes, for each selected audio/video stream pair, a rate for pre-buffering the audio stream and a rate for pre-buffering the video stream. For a particular audio/video stream pair, the rates of pre-buffering the audio stream and the video stream are determined based on two factors. First, because audio data is typically much smaller than video data, the audio stream is pre-buffered at a higher rate than the video stream. Pre-buffing audio data at a higher rate than video data allows for a quick start to playing the audio/video stream pair if the audio/video stream pair is selected for playback without compromising audio delivery quality. Second, the rates of pre-buffering the audio stream and the video stream are proportional to the probability that the audio/video stream pair will be selected for viewing next. If the probability is high, then the rates of pre-buffering the audio stream and the video stream are higher than the rates of pre-buffering a different audio/stream pair a lower probability.

At step 508, the predictive pre-buffering engine 254 causes each of the selected audio/video stream pairs to be downloaded for pre-buffering at the rates computed in step 506.

Advantageously, pre-buffering audio/video stream pairs having a high probability of being selected for viewing next allows for a seamless transition when a user selects one of the pre-buffered audio/video stream pairs for viewing. In addition, pre-buffering the audio portion of an audio/video stream pair at a higher rate than the video portion of the audio/video stream pair allows for playback to be started faster without compromising audio quality.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method, comprising:
identifying a plurality of audio/video stream pairs that may be selected for playback subsequent to a currently playing audio/video stream pair;
for each audio/video stream pair included in the plurality of audio/video stream pairs, computing a probability that the audio/video stream pair will be selected next for playback;
based on the probabilities, selecting a first audio/video stream pair and a second audio/video stream pair for pre-buffering, wherein a first probability reflecting that the first audio/video stream will be selected next for playback is greater than a second probability reflecting that the second audio/video stream will be selected next for playback; and
pre-buffering at least a portion of the first audio/video stream pair and at least a portion of the second audio/video stream pair, wherein rates for pre-buffering the at least a portion of the first audio/video stream pair are proportional to the first probability, and rates for pre-buffering the at least a portion of the second audio/video stream pair are proportional to the second probability.

2. The computer-implemented method of claim 1, wherein pre-buffering the at least a portion of the first audio/video stream pair comprises pre-buffering at least a portion of a first audio stream associated with the first audio/video stream pair at a first rate and pre-buffering at least a portion of a first video stream associated with the first audio/video stream pair at a second rate, wherein the first rate is greater than the second rate.

3. The computer-implemented method of claim 1, wherein pre-buffering at least a portion of the first audio/video stream pair and at least a portion of the second audio/video stream pair comprises downloading the at least a portion of the first audio/video stream pair from a content server and storing the at least a portion of the first audio/video stream in a content buffer, and downloading the at least a portion of the second audio/video stream pair from the content server or a different content server and storing the at least a portion of the second audio/video stream pair in the content buffer.

4. The computer-implemented method of claim 2, wherein pre-buffering the least a portion of the second audio/video stream pair comprises pre-buffering at least a portion of a second audio stream associated with the second audio/video stream pair at a third rate, and pre-buffering at least a portion of a second video stream associated with the second audio/video stream pair at a fourth rate, wherein the first rate is greater than the third rate, and the second rate is greater than the fourth rate.

5. The computer-implemented method of claim 3, wherein the content buffer includes an audio buffer for storing units of audio content associated with downloaded audio/video stream pairs and a video buffer for storing units of video content associated with downloaded audio/video stream pairs.

6. The computer-implemented method of claim 1, further comprising computing the rates for pre-buffering the at least a portion of the first audio/video stream pair and the rates for pre-buffering the at least a portion of the second audio/video stream pair.

7. The computer-implemented method of claim 1, wherein the plurality of audio/video stream pairs is identified based on identification information included in a user interface.

8. The computer-implemented method of claim 7, wherein the identification information comprises, for each audio/video stream pair included in the plurality of audio/video stream pairs, at least one of a title and an image representing the audio/video stream pair.

9. The computer-implemented method of claim 1, wherein more of the first audio/video stream pair is pre-buffered than the second audio/video stream pair.

10. The computer-implemented method of claim 1, wherein at least one of the first probability and the second probability is based on a rating associated with the currently playing audio/video stream pair.

11. The computer-implemented method of claim 10, wherein the first probability is further based on a rating associated with the first audio/video stream pair.

12. A non-transitory computer-readable medium including instructions that, when executed by a processor, cause the processor to perform the steps of:
identifying a plurality of audio/video stream pairs that may be selected for playback subsequent to a currently playing audio/video stream pair;
for each audio/video stream pair included in the plurality of audio/video stream pairs, computing a probability that the audio/video stream pair will be selected next for playback;
based on the probabilities, selecting a first audio/video stream pair and a second audio/video stream pair for pre-buffering, wherein a first probability reflecting that the first audio/video stream will be selected next for playback is greater than a second probability reflecting that the second audio/video stream will be selected next for playback;

computing a first set of rates for pre-buffering the first audio/video stream pair and a second set of rates for pre-buffering the second audio/video stream pair, wherein the first set of rates is proportional to the first probability, and the second set of rates is proportional to the second probability; and pre-buffering at least a portion of the first audio/video stream pair based on the first set of rates and at least a portion of the second audio/video stream pair based on the second set of rates pair.

13. The non-transitory computer-readable medium of claim 12, wherein the first set of rates includes a first rate and a second rate, and pre-buffering the at least a portion of the first audio/video stream pair comprises pre-buffering at least a portion of a first audio stream associated with the first audio/video stream pair at a first rate and pre-buffering at least a portion of a first video stream associated with the first audio/video stream pair at a second rate, wherein the first rate is greater than the second rate.

14. The non-transitory computer-readable medium of claim 13, wherein the second set of rates includes a third rate and a fourth rate, and pre-buffering the least a portion of the second audio/video stream pair comprises pre-buffering at least a portion of a second audio stream associated with the second audio/video stream pair at a third rate and pre-buffering at least a portion of a second video stream associated with the second audio/video stream pair at a fourth rate, wherein the first rate is greater than the third rate, the second rate is greater than the fourth rate, and the third rate is greater than the fourth rate.

15. The non-transitory computer-readable medium of claim 12, wherein the plurality of audio/video stream pairs is identified based on identification information included in a user interface that comprises, for each audio/video stream pair included in the plurality of audio/video stream pairs, at least one of a title and an image representing the audio/video stream pair.

16. The non-transitory computer-readable medium of claim 12, wherein more of the first audio/video stream pair is pre-buffered than the second audio/video stream pair.

17. The non-transitory computer-readable medium of claim 12, wherein the first probability is based on a rating associated with the currently playing audio/video stream pair.

18. The non-transitory computer-readable medium of claim 17, wherein the first probability is further based on a rating associated with the first audio/video stream pair.

19. The non-transitory computer-readable medium of claim 12, wherein the first probability is based on a number of users having viewed the currently playing audio/video stream pair and subsequently selecting the first audio/video stream pair for playback.

20. A system, comprising:
a memory that includes a predictive pre-buffering engine; and
a processor coupled to the memory, wherein, upon executing the predictive pre-buffering engine, the predictive pre-buffering engine configures the processor to:
identify a plurality of audio/video stream pairs that may be selected for playback subsequent to a currently playing audio/video stream pair;
for each audio/video stream pair included in the plurality of audio/video stream pairs, compute a probability that the audio/video stream pair will be selected next for playback;
based on the probabilities, select a first audio/video stream pair and a second audio/video stream pair for pre-buffering, wherein a first probability reflecting that the first audio/video stream will be selected next for playback is greater than a second probability reflecting that the second audio/video stream will be selected next for playback; and
pre-buffer at least a portion of the first audio/video stream pair and at least a portion of the second audio/video stream pair, wherein rates for pre-buffering the at least a portion of the first audio/video stream pair are proportional to the first probability, and rates for pre-buffering the at least a portion of the second audio/video stream pair are proportional to the second probability.

* * * * *